(12) United States Patent
Duplat

(10) Patent No.: US 6,972,765 B1
(45) Date of Patent: Dec. 6, 2005

(54) METHOD AND A SYSTEM FOR PRODUCING, ON A GRAPHIC INTERFACE, THREE-DIMENSIONAL ANIMATED IMAGES, INTERACTIVE IN REAL TIME

(75) Inventor: Bertrand Duplat, Paris (FR)

(73) Assignee: Virtools, Paris (FR)

( * ) Notice: Subject to any disclaimer, the term of this patent is extended or adjusted under 35 U.S.C. 154(b) by 365 days.

(21) Appl. No.: 10/089,881

(22) PCT Filed: Oct. 6, 2000

(86) PCT No.: PCT/FR00/02791

§ 371 (c)(1),
(2), (4) Date: Aug. 2, 2002

(87) PCT Pub. No.: WO01/26058

PCT Pub. Date: Apr. 12, 2001

(30) Foreign Application Priority Data

Oct. 7, 1999  (FR) .................................. 99 12731

(51) Int. Cl.[7] ............................................. G06T 15/00

(52) U.S. Cl. ..................................... 345/473; 715/700
(58) Field of Search ............................... 345/473, 474, 345/475, 619, 440; 715/700, 701, 716

(56) References Cited

U.S. PATENT DOCUMENTS

| 5,867,175 A | | 2/1999 | Katzenberger et al. ...... 345/473 |
| 6,011,562 A | * | 1/2000 | Gagne et al. ................ 345/473 |
| 6,084,590 A | * | 7/2000 | Robotham et al. .......... 345/419 |
| 6,514,142 B1 | * | 2/2003 | Hattori et al. ................. 463/31 |
| 6,664,965 B1 | * | 12/2003 | Yamamoto et al. .......... 345/473 |

FOREIGN PATENT DOCUMENTS

| WO | WO 98/35320 | 8/1998 |
| WO | WO 98/45813 | 10/1998 |
| WO | WO 99/06961 | 2/1999 |

* cited by examiner

Primary Examiner—Phu K. Nguyen
(74) Attorney, Agent, or Firm—Westman, Champlin & Kelly

(57) ABSTRACT

The invention concerns a method for producing on a graphic interface (1) three-dimensional animated graphic images comprising objects (8, 9). Said graphic images are designed by a designer to be interactively animated, in real time, by the users for whom they are designed. The method comprises steps which consist in: selecting at least an object (8, 9) and displaying it on the graphic interface (1, 1a); selecting and assigning to an object (8) movements (1b, 12, 1c, 13) having the property of interactively reacting, in real time, to external prompting: assembling (17a, 17b, 23a, 23b) on a graphic interface (1, 1d) visual elements (15, 16) symbolizing the objects and the movements (14, 23) assigned to them.

20 Claims, 4 Drawing Sheets

Figure 1:
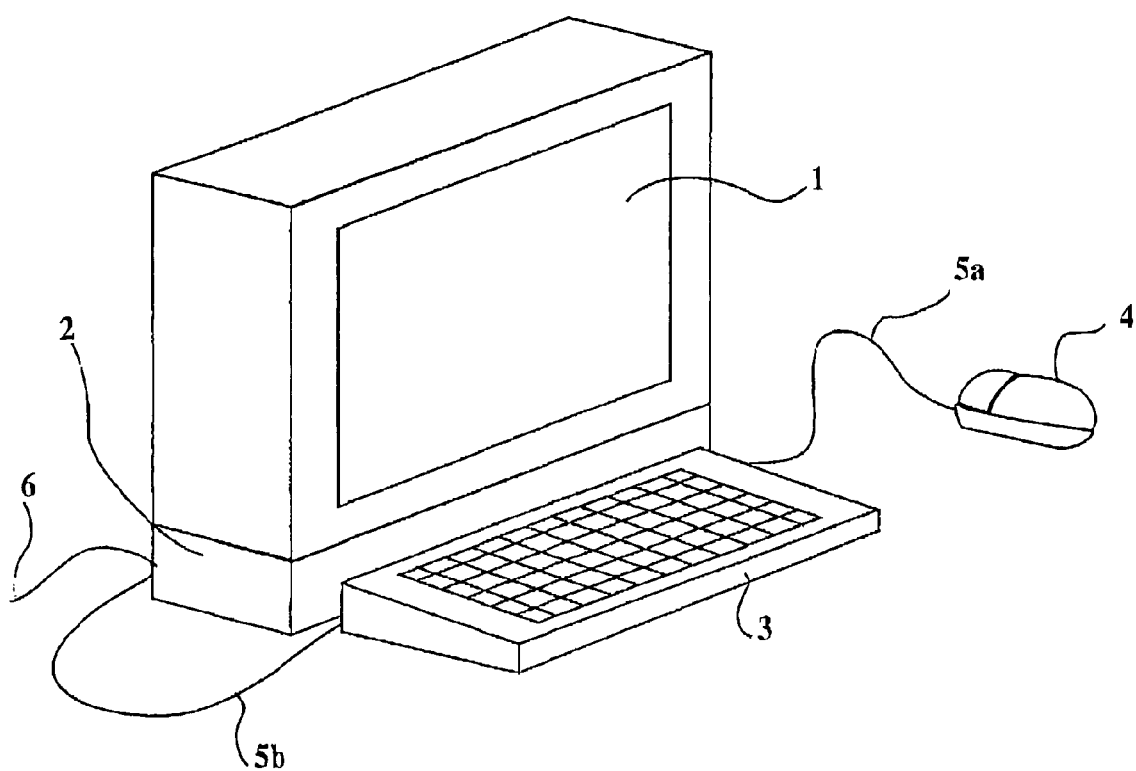

METHOD AND A SYSTEM FOR PRODUCING, ON A GRAPHIC INTERFACE, THREE-DIMENSIONAL ANIMATED IMAGES, INTERACTIVE IN REAL TIME

CROSS-REFERENCE TO RELATED APPLICATIONS

This application is a Section 371 National Stage application of International application No. PCT FR00/02791 filed Oct. 6, 2000 published Apr. 12, 2001 as WO 01/26058, not in English.

FIELD OF THE INVENTION

This invention concerns the processes and the systems that permit the creation of animated images on a graphic interface.

BACKGROUND OF THE INVENTION

There is knowledge of such processes and such systems. We shall cite notably the following documents, which describe such graphic interfaces: WO 99 06961 (MORGAN Gareth John d'Arcy et al), WO 98 35320 (PARKIN Godfrey Maybin et al.), WO 98 45813, U.S. Pat. No. 5,867,175A (MACKINNON Donald Glen et al.).

The invention concerns, more specifically, a process for creating on a graphic interface three-dimensional animated graphical images representing scenes comprising objects and/or characters. The graphical images are designed by a designer-operator so that they can later be animated, interactively, in real time, by the user (the "final consumer" player) for whom they are intended.

The process in the invention comprises the steps described hereinafter:
a) the step of selecting, in libraries of objects and/or characters, at least one object and/or character,
b) the step of displaying the object and/or character on the graphic interface,
c) the step of selecting, in the behaviour libraries, the behaviour of an object and/or a character,
d) the step of assigning the selected behaviour to an object or to a character appearing on the graphic interface.

The aforementioned behaviours have the characteristic of reacting, in whole or in part, interactively, in real time, to requests. More specifically, the behaviours react to efforts to elicit actions emanating from the player-users. The latter intervene by means of a control unit, notably a keyboard or a mouse. For example, the explosive behaviour of a first object can be linked to the movement of a second object passing close to the first object. The second object is activated and set in motion by the player-user by means of the control unit.

SUMMARY OF THE INVENTION

The process in the invention comprises, in addition, the step of assembling on a graphic interface, according to the sequences and the tree structures of an interactive animated script that is in the course of being designed, visual components symbolizing the objects and/or the characters involved in the animated scene, as well as the behaviours that are assigned to them.

Script designers, notably of interactive games, can thus display the different sequences and the tree structures of the interactive animated scenarios as they are being designed. Game designers can then concentrate on the writing of interactive scripts, and then produce them rapidly using ergonomic graphical tools on their graphic interface.

Preferably, the process in the invention comprises, in addition, the step of creating series of behaviours, notably, the explosion of one object can be sequenced to the movement of another object passing close by in the scene represented on the graphic interface. It is thus possible to generate modules (otherwise known as components) of sequenced behaviours of objects and/or characters, which can be reassembled into other modules (or components), then into more complex interactive animated scripts.

Thus, thanks to these series of behaviours, the interaction, in real time, with the player is strengthened. The event that occurs is calculated, at any given moment, as a function of the environment, which the player can modify.

The procedure in the invention preferably comprises, in addition, the step of selecting, in libraries of camera perspectives, the perspective of the camera displaying the three-dimensional scene.

The invention also involves a system for creating on a graphic interface three-dimensional graphical images representing scenes comprising objects and/or characters. The graphic images are designed by a designer-operator to be animated interactively, in real time, by the users for whom they are intended. The graphic interface is associated with a calculating device and a command unit.

In the invention, the calculating devices and the command units comprise a first calculating device and a first command device. This first calculation device and this first command device allow the designers:
  to select, in libraries of objects, and/or characters, at least one object and/or character, and
  to display the object and/or character on the graphic interface.

The calculating devices and command units comprise, in addition, a second calculating device and a second command device. These devices allow the designers:
  to select, in libraries of behaviours, the behaviour of an object and/or a character, for example, an explosive behaviour or a movement, and
  to assign the selected behaviour to an object or to a character appearing on the graphic interface.

The behaviours have the characteristic of reacting interactively, in whole or in part, to efforts to elicit actions emanating from the users (the "final consumer" player) intervening by means of an operating control, notably a keyboard. For example, the explosive behaviour of a first object can be linked to the movement of a second object passing close by the first object. The movement of the second object is activated by the player-user by means of the operating control.

In addition, the calculating devices and the command units comprise a means of activation for activating on the graphic interface one or more areas on which the designer-operator assembles, according to the sequence and the tree structures of an interactive animated script that is being designed, visual components symbolizing the objects and/or characters involved in the animated scene as well as the behaviours that are assigned to them. The designer can thus display the various sequences and tree structures of the script as it is in the process of being designed. This technical trait makes an essential contribution to the ergonomics of the system of creating three-dimensional graphical images that are interactive in real time.

The calculating devices and the command units of the system in the invention preferably also comprise a third calculating device and a third command device for selecting in the libraries of camera perspectives the camera perspective displaying the three-dimensional scene.

In addition, the calculating devices and the command units of the system in the invention comprise a fourth calculating device and a fourth command unit for creating series of behaviours, notably the explosion of one object during the movement of another object close by in the scene represented on the graphic interface. It is thus possible to generate modules of sequenced behaviours of objects and/or characters, which can be reassembled into other modules, and then into more complex interactive animated scripts.

Figure 2:
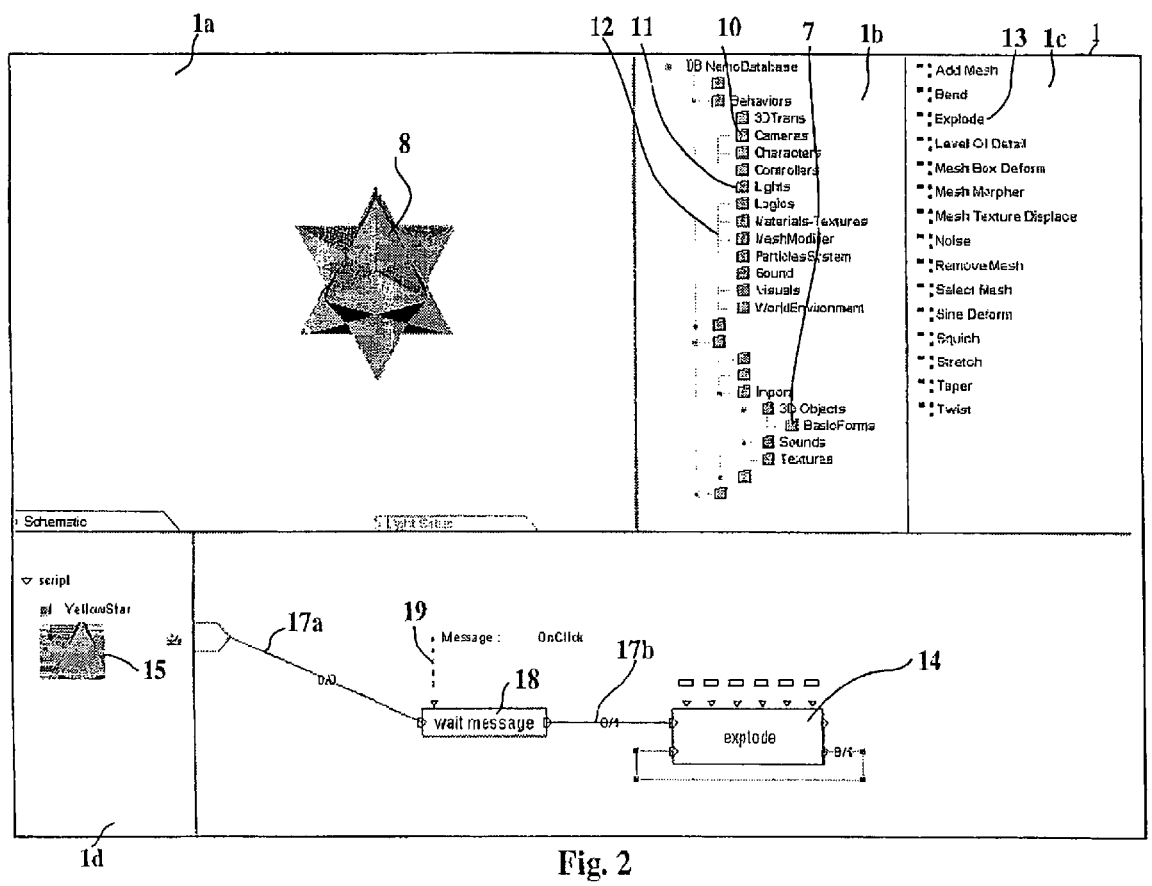
Figure 3:
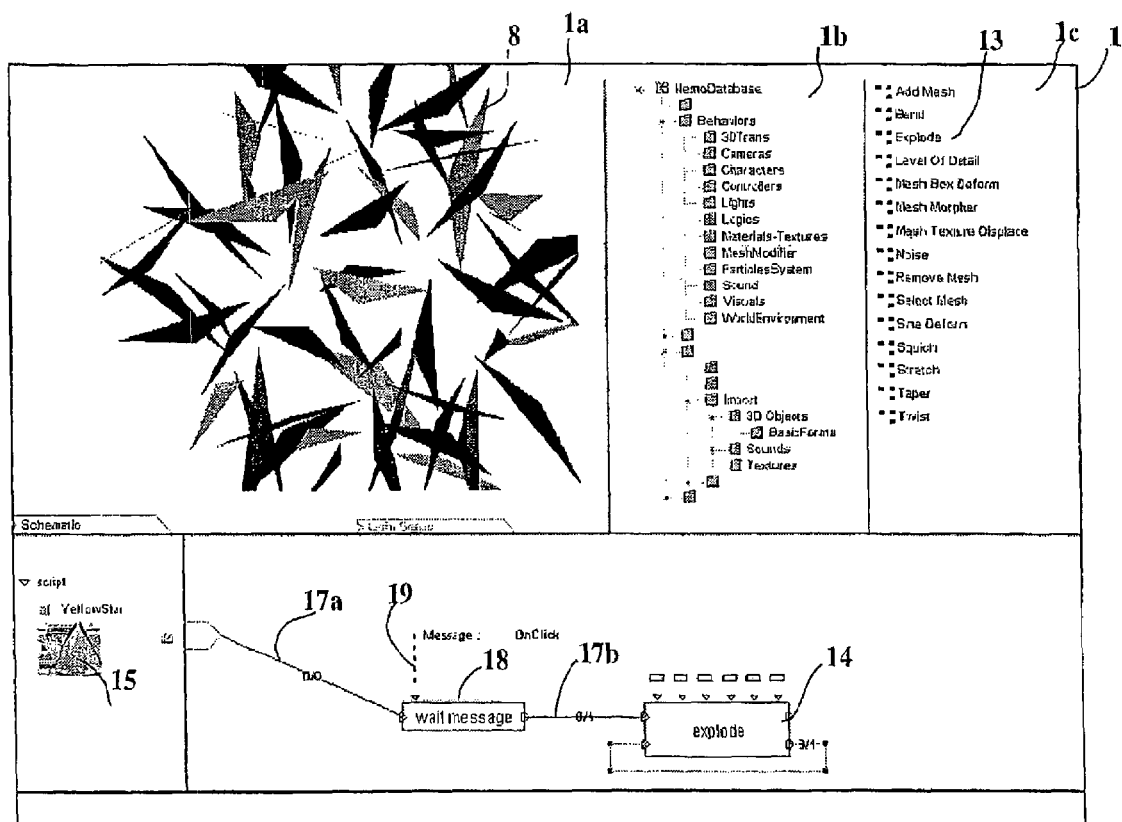
Figure 4:
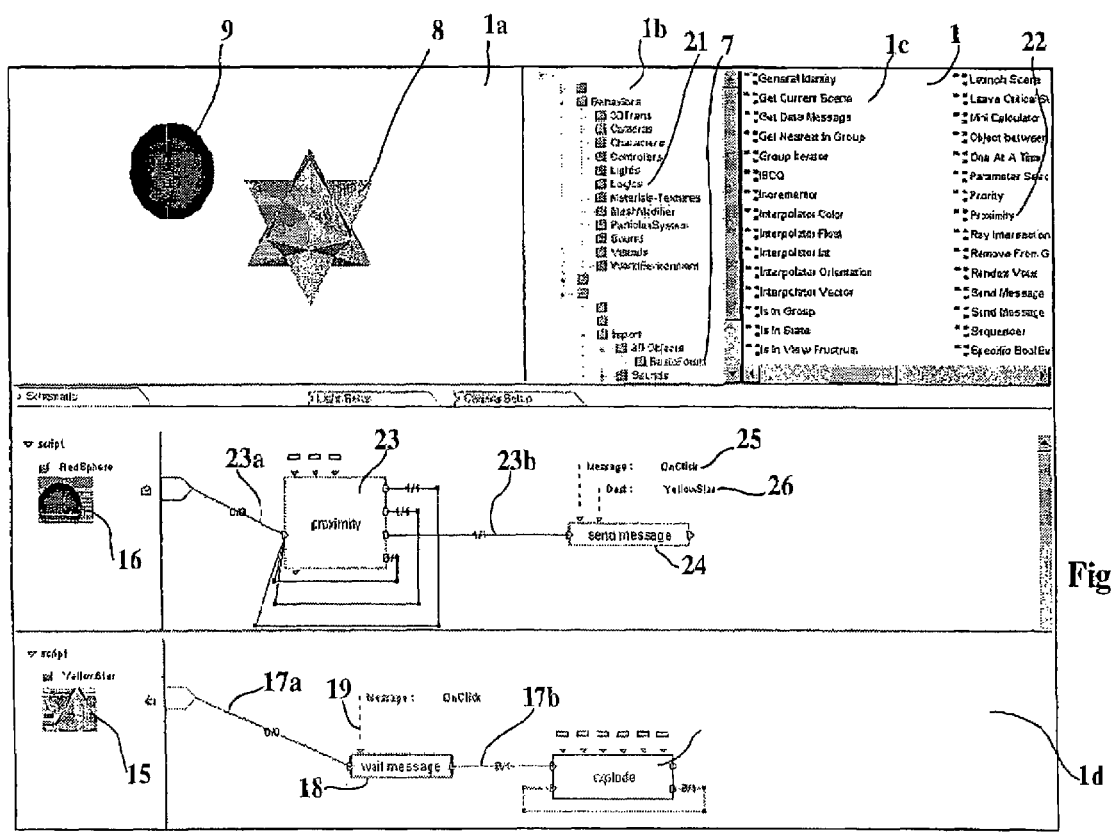

Other characteristics and advantages of the invention will appear on a reading of the description of production variants of the invention, given to provide indicative, but not exhaustive, examples and on examination of the following:

FIG. 1, which illustrates a graphic computer interface in the invention and the associated calculating devices and command units, FIGS. 2 and 3, which illustrate the graphical tools used by a designer of animated scripts for selecting a star in a database and for displaying on the graphic interface, as well as for assigning a behaviour to it-exploding under certain conditions, FIG. 4, which shows the graphical tools utilised by a designer of animated scripts in order to link the explosive behaviour of the star to follow the movement of a sphere close by.

We shall now describe, while referring to FIGS. 1, 2, and 3, the graphical tools used by a designer of animated scripts in order to select a star 2 in a data base 3 and to display it on the graphic interface 1, 1a, as well as to assign to it a behaviour 5, that of exploding under certain conditions.

Note: The written information appearing in plain language on the graphic interface is in the English language. In fact, the graphic interface is intended for sale not only in France but also outside of France. The directions concerning its use have thus been expressed in English.

The lexicon that follows hereinafter provides the translations of the words or expressions that appear in the description of this invention.

Basic forms: basic forms
Yellow star: Yellow star
Red sphere: Red sphere
Cameras: Cameras
Lights: Lights
Under the behaviour menu: Under the menu of behaviours
Mesh modifier: "3D shape modifier" behaviour
Explode: "Explosion" behaviour
Wait message: "Await message" behaviour
On click: "On mouse click" behaviour
Logics: "Logic" category behaviour
Proximity: Behaviour detecting the proximity between two objects
Send message: "send message" behaviour The graphic interface 1 is associated with a calculating device 2 and a command unit, notably a keyboard 3 and a mouse 4. Connection cables 5a and 5c interconnect these various devices. An electric power cable 6 provides the necessary energy. An operating system allows the functioning of the entire system to be managed in a self-explanatory manner.

The calculating devices 2 and the command units 3, 4 comprise a first calculating device and a first command device. This first calculating device and first command device allow the designer of scripts to select, in the libraries of objects and/or characters appearing on the graphic interface 1, at least one object and/or character. To this end, by means of the command unit 4, the script designer makes a menu comprising one "Basic Forms" icon 7 appear in the window 1b of the graphic interface 1. By clicking on this icon by means of the command unit 4, we make a menu with a list of the various objects and/or characters that are likely to be selected appear on part 1c of the graphic interface 1. In the case of the production variant described, the following icons appear: "YellowStar" and "RedSphere". By clicking on the "YellowStar" and/or "RedSphere" icon, we make a three-dimensional image of these objects (FIG. 2, reference 8 and FIG. 4, reference 9) appear in part 1a of the graphic interface 1. The position of this object vis-à-vis the spectator (the perspective of the camera), as well as the position of the light source, can be selected by clicking on the "Cameras" 10 or "Lights" 11 icons that appear in part 1b of the graphic interface 1.

By clicking on the "YellowStar" and/or "RedSphere" icon, we cause a schematic representation FIG. 2, 15, and FIG. 4, 16 of the "YellowStar" and "RedShere" objects to appear simultaneously in the part 1d of the graphic interface 1 that is devoted to the schematic representation of the modules comprising the interactive scenario.

In the invention, the calculating device 2 and the command units 3, 4 comprise, in addition, a second calculating device and a second command device, which allow the script designer to select, in the behaviour libraries appearing on the graphic interface 1, the behaviour of an object and/or a character, for example, an explosive behaviour or a movement. To this end, by means of the command unit 4, the script designer causes a sub-menu of behaviours called "Behaviors" comprising a "MeshModifier" icon 12 to appear in the window 1b of the graphic interface 1. By clicking on this icon by means of the command unit 4, we cause a menu to appear in part 1c of the graphic interface 1 with a list of behaviours of the "MeshModifier" type that are likely to be selected. Notably, in the case of the production variant described here, the "Explode" icon 13 appears. By clicking on the "Explode" icon, we cause a parametrable image 14 of this type of behaviour to appear in part 1d of the graphic interface 1, opposite the schematic representation 15 of the "Yellow Star" object. This image may, for example, be in the shape of a rectangle with entrance and exit markers. In the case described in referring to FIG. 2, a parametrable link 17a, 17b links, through a "wait message" behavioural function 18, the schematic representation 15 of the "YellowStar" object to the parametrable image 14 of the "Explode" behaviour. We have thus assigned to the "YellowStar" object 8, 15 the "Explode" behaviour 14. The "wait message" behavioural function 18 is also represented by a rectangle with entrance and exit markers. The expected message, which elicits the execution of the "Explode" behaviour 14, in the case represented here, the "OnClick" message 19. Thus, subsequently, after designing the game, the user-player ("final consumer") can, by clicking with the command unit 4, provoke the explosion of the "YellowStar" object. The game designed by the designer-operator thus has the characteristic of being interactive in real time with events or efforts originating from the exterior, for example, from a player's action on the mouse.

We shall now describe FIG. 4, which presents the graphic tools used by a designer of interactive animated scripts to pipe the explosion behaviour of the "YellowStar" object when the "RedSphere" object passes close to it. We recognize in FIG. 4 most of the components described in referring to FIGS. 1, 2, and 3; they bear the same references. The script concerning the "RedSphere" is described below. In the library in the window 1*b*, the "Logics" behaviour 21 has been selected. The corresponding window 1*c* comprises in its menu "Proximity" 22. The "Proximity" function 22 is symbolised by the rectangle 23, in the script 1*d* concerning "RedSphere". A logical link 23*a* is established between the "Proximity" behaviour 22, 23 and the "RedSphere". A logical link 23*b* is likewise established between the "Proximity" behaviour 22, 23 and the "send message" function, which is represented in the script by the rectangle 24. The "send message" function 24 issues the "OnClick" message 25 at destination 26 of the "YellowStar" object. Thus, when the "RedSphere" object passes close by the object "YellowStar", the "OnClick" message is issued and activates the "wait message" function, which activates, in turn, the "Explode" behaviour assigned to the object "YellowStar". "Proximity" is a behaviour that verifies that the distance between two objects reaches a set threshold. The logical link is established by utilising a dialogue box by means of which the two objects are defined.

According to a process comparable to that described above, we can simultaneously control the movement behaviour of the object "RedSphere", by using command units 3 and 4. Thus, in steering the course of movement of the "RedSphere" object as desired, the player provokes the explosion of the "Yellow Star" object, when the "Red Sphere" object passes near the "Yellow Star" object or not, as the player wishes.

This example allows us to show two levels of interactivity in real time:

On the one hand, (the first level) the 3D objects "Yellow Star" and "RedSphere" interact in accordance with events that proceed on the scene of the graphic interface, On the other hand, (the second level) the efforts to elicit action that affect the unfolding of the events can emanate from the "end consumer" player activating the operating controls (keyboard, mouse).

The calculating devices 2 and the command units 3 and 4 allow the script designer to create series of behaviours, notably, the explosion of one object while another object is passing nearby. The calculating devices 2 and the command devices 3, 4 comprise a means of activation for activating on the graphic interface 1 one or more zones 1*d* on which the operator can assemble, according to the sequences and the tree structures of an interactive animated script in the course of being designed, visual components 15, 16 symbolising the objects involved 8, 9 in the animated scene as well as the behaviours 14, 23 that are assigned to them. This combination of means also allows the generation of sequenced modules of object behaviours, which can be reassembled into other modules and then into more complex interactive animated scripts. It is thereby possible to display the various sequences and the tree structures of the script as it is being designed.

What is claimed is:

1. A process for creating on a graphic computer interface three-dimensional animated graphical images representing scenes with at least one of the categories in the group comprising objects and characters; the graphical images having been designed by a designer-operator to be animated interactively, in real time, by the users for whom such interactively animated images are intended, the process comprising the following steps:

the step of selecting from libraries of objects, or libraries of characters or libraries comprising objects and characters, at least one object, or one character or one object and one character, the step of displaying the object, or the character, or the object and the character on the graphic interface, the step of selecting the behavior of an object, or of a character or of an object and a character from behavior libraries, the behaviors reacting in whole or in part interactively, in real time, to efforts on the part of the users, intervening by means of an operating control, the step of assigning the selected behavior to an object or a character appearing on the graphic interface, the step of assembling on a graphic interface, according to the sequences and the tree structures of an interactive animated script, in the course of being designed, visual elements symbolizing the relevant objects or characters or the relevant objects and characters involved with the animated scene as well as the behaviors that are attributed to the objects, or to the characters or to the objects and characters, the visual elements symbolizing the behaviors having at least one input terminal to allow a connection with the objects, or the characters or the objects and characters, at least one of the visual elements symbolizing a behavior of waiting for a user's action, this visual element having an input or output terminal connected to another visual element symbolizing behavior, so that it is possible to visualize the different sequences and the tree structures of the interactive animated script as the animated script is in the process of being designed.

2. A process of claim 1, further comprising the following steps:

the step of creating series of behaviors may be linked in a series to the movement of another object passing close by in the scene represented on the graphic interface, in such a manner that is possible to generate sequential modules of sequenced behaviors for objects or characters or both, which can in turn be reassembled into other modules and then into more complex interactive animated scripts.

3. A process of claim 2, further comprising the following step:

the step of selecting, in the library of camera perspectives, the perspective of the camera projecting the three-dimensional scene.

4. A process of claim 1, further comprising the following step:

the step of selecting, in the library of camera perspectives, the perspective of the camera projecting the three-dimensional scene.

5. A process of claim 1, wherein a behavior is an explosive behavior, and the operating control links the explosive behavior of a first object to movement of a second object passing close by the first object.

6. A process of claim 5, further comprising the following steps:

the step of creating series of behaviors including an explosive behavior may be linked in a series to the movement of another object passing close by in the scene represented on the graphic interface, in such a manner that is possible to generate sequential modules of sequenced behaviors for objects or characters or both, which can in turn be reassembled into other modules and then into more complex interactive animated scripts.

7. A process of claim 5, further comprising the following step:

the step of selecting, in the library of camera perspectives, the perspective of the camera projecting the three-dimensional scene.

8. A process according to claim 1 wherein at least a visual element symbolizing a behavior is able to be parameterized.

9. A process according to claim 1 wherein a visual element symbolizing a behavior is connected to a link able to be parameterized.

10. A system for creating three-dimensional graphical images representing scenes with at least one of the categories in the group comprising objects and characters on a graphic interface; the graphical images being designed by a designer-operator in order to be animated interactively, in real time, by the users for which such interactively animated images were intended; the graphic interface being associated with a calculating device and a command unit;

the calculating devices and command units comprising a first means of calculation and a first means of command for selecting at least one object, or one character or one object and one character from libraries of objects, or libraries of characters or libraries comprising objects and characters, for displaying the object, the character or the object and the character on the graphic interface, the calculating devices and command units comprising, in addition, a second calculating device and a second command device for selecting from the behavior libraries the behavior of an object, a character or an object and a character, and for assigning to an object or character appearing on the graphic interface the selected behavior;

the behaviors reacting in whole or part interactively, in real time, to efforts on the part of the users intervening by means of an operating control, notably a keyboard;

the calculating devices and command units comprising, in addition, activation devices for activating on the graphic interface one or more areas on which the designer-operator assembles visual elements symbolizing the objects, the characters or the objects and characters involved with the animated scene as well as the behaviors that are assigned to the objects, the characters or the objects and characters, according to the sequences and the tree structures of an interactive animated script in the process of being designed, the visual elements symbolizing the behaviors having at least one input terminal to allow a connection with the objects, or the characters or the objects and characters, at least one of the visual elements symbolizing a behavior of waiting for a user's action, this visual element having an input or output terminal connected to another visual element symbolizing behavior, such that it is possible to visualize the different sequences and the tree structures of the script as the script is in the process of being designed.

11. A system as in claim 10, such that the calculating devices and command units comprise, in addition:

a third calculating device and a third command device for selecting, in the libraries of camera perspectives, the camera perspective projecting the three-dimensional scene.

12. A system as in claim 11, such that the calculating devices and command units comprise, in addition:

a fourth calculating device and a fourth command device for creating series of behaviors while another object is passing close by in the scene represented on the graphic interface in such a manner that the system allows modules of sequenced behaviors for objects or character or both to be generated, which can be reassembled into other modules, and then into more complex animated scripts.

13. A system as in claim 10, such that the calculating devices and command units comprise, in addition:

a fourth calculating device and a fourth command device for creating series of behaviors while another object is passing close by in the scene represented on the graphic interface in such a manner that the system allows modules of sequenced behaviors for objects or characters or both to be generated, which can be reassembled into other modules, and then into more complex animated scripts.

14. A system as in claim 10, wherein a behavior is an explosive behavior, and the operating control links the explosive behavior of a first object to movement of a second object passing close by the first object.

15. A system as in claim 14, such that the calculating devices and command units comprise, in addition:

a third calculating device and a third command device for selecting, in the libraries of camera perspectives, the camera perspective projecting the three-dimensional scene.

16. A system as in claim 15, such that the calculating devices and command units comprise, in addition:

a fourth calculating device and a fourth command device for creating series of behaviors that includes an explosive behavior while another object is passing close by in the scene represented on the graphic interface in such a manner that the system allows modules of sequenced behaviors for objects or characters or both to be generated, which can be reassembled into other modules, and then into more complex animated scripts.

17. A system as in claim 14, such that the calculating devices and command units comprise, in addition:

a fourth calculating device and a fourth command device for creating series of behaviors that includes an explosive behavior while another object is passing close by in the scene represented on the graphic interface in such a manner that the system allows modules of sequenced behaviors for objects or characters or both to be generated, which can be reassembled into other modules, and then into more complex animated scripts.

18. A system as in claim 10, wherein at least a visual element symbolizing a behavior is able to be parameterized.

19. A system according to claim 10, wherein a visual element symbolizing a behavior is connected to a link able to be parameterized.

20. A process for creating on a graphic computer interface three-dimensional animated graphical images representing scenes with at least one of the categories in the group comprising objects and characters; the graphical images having been designed by a designer-operator to be animated interactively, in real time, by the users for whom such interactively animated images are intended, the process comprising the following steps:

the step of selecting from libraries of objects, or libraries of characters or libraries comprising objects and characters, at least one object, or one character or one object and one character, the step of displaying the object, or the character, or the object and the character on the graphic interface, the step of selecting the behavior of an object, or of a character or of an object and a character from behavior libraries, the behaviors reacting in whole or in part interactively, in real time, to efforts on the part of the users, intervening by means of an operating control, the step of assembling on a graphic interface, according to the sequences and the tree structures of an interactive animated script, in the course of being designed, visual elements symbolizing the relevant objects or characters or the relevant objects and characters involved with the animated scene as well as the behaviors that are attributed to the objects, or to the characters or to the objects and characters, the visual elements symbolizing the behaviors having at least one input terminal to allow a connection with the objects, or the characters or the objects and characters, at least one of the visual elements symbolizing a behavior of waiting for a user's action, this visual element having an input or output terminal connected to another visual element symbolizing behavior, so that it is possible to visualize the different sequences and the tree structures of the interactive animated script as the animated script is in the process of being designed.

* * * * *